United States Patent
Kwon et al.

(10) Patent No.: US 12,123,065 B2
(45) Date of Patent: Oct. 22, 2024

(54) GRAIN-ORIENTED ELECTRICAL STEEL SHEET AND METHOD FOR MANUFACTURING SAME

(71) Applicant: POSCO, Pohang-si (KR)

(72) Inventors: Oh Yeoul Kwon, Pohang-si (KR); Se Min Park, Pohang-si (KR); Jong-Tae Park, Pohang-si (KR); Jae Kyoum Kim, Pohang-si (KR); Seung Gon Lee, Pohang-si (KR); Won Gul Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 725 days.

(21) Appl. No.: 16/065,785

(22) PCT Filed: Dec. 23, 2016

(86) PCT No.: PCT/KR2016/015235
§ 371 (c)(1),
(2) Date: Jun. 22, 2018

(87) PCT Pub. No.: WO2017/111555
PCT Pub. Date: Jun. 29, 2017

(65) Prior Publication Data
US 2018/0371573 A1    Dec. 27, 2018

(30) Foreign Application Priority Data
Dec. 24, 2015 (KR) .......... 10-2015-0186091

(51) Int. Cl.
*B23K 26/364* (2014.01)
*B23K 26/40* (2014.01)
(Continued)

(52) U.S. Cl.
CPC .......... *C21D 8/1283* (2013.01); *B23K 26/364* (2015.10); *B23K 26/40* (2013.01);
(Continued)

(58) Field of Classification Search
CPC .................................................... C21D 8/1283
See application file for complete search history.

(56) References Cited

U.S. PATENT DOCUMENTS

2002/0000265 A1* 1/2002 Toda ................ C22C 38/18
148/307
2013/0098507 A1 4/2013 Omura et al.
(Continued)

FOREIGN PATENT DOCUMENTS

CN    104039988 A    9/2014
CN    104099458 A    10/2014
(Continued)

OTHER PUBLICATIONS

International Search Report and Written Opinion issued in International Patent Application No. PCT/KR2016/015235 mailed Apr. 3, 2017 (English translation of Search Report).
(Continued)

*Primary Examiner* — Jenny R Wu
(74) *Attorney, Agent, or Firm* — Morgan, Lewis & Bockius LLP (57) ABSTRACT

A grain-oriented electrical steel sheet according to an embodiment of the present disclosure includes: a forsterite layer formed on the surface of an electrical steel sheet; a groove which is formed on the forsterite layer in a direction perpendicular to a rolling direction; and a forsterite calcination layer which is formed in the direction of both ends of the electrical steel sheet on the basis of an upper end of the groove and has a width of 1.1 to 1.3 times the width of the groove.

13 Claims, 4 Drawing Sheets

(51) Int. Cl.
  *C21D 8/12*   (2006.01)
  *C21D 10/00*  (2006.01)
  *C23G 1/02*   (2006.01)
  *H01F 1/18*   (2006.01)
  *B23K 103/04* (2006.01)
  *C21D 9/46*   (2006.01)
  *C22C 38/02*  (2006.01)

(52) U.S. Cl.
  CPC ............... *C21D 8/12* (2013.01); *C21D 10/00* (2013.01); *C23G 1/02* (2013.01); *H01F 1/18* (2013.01); *B23K 2103/04* (2018.08); *C21D 8/1222* (2013.01); *C21D 8/1233* (2013.01); *C21D 8/1255* (2013.01); *C21D 8/1294* (2013.01); *C21D 9/46* (2013.01); *C21D 2201/05* (2013.01); *C22C 38/02* (2013.01)

(56) References Cited

U.S. PATENT DOCUMENTS

| | | | |
|---|---|---|---|
| 2013/0098508 A1 | 4/2013 | Yamaguchi et al. | |
| 2013/0189490 A1 | 7/2013 | Watanabe et al. | |

FOREIGN PATENT DOCUMENTS

| | | | |
|---|---|---|---|
| CN | 105063312 A | | 11/2015 |
| EP | 1 227 163 A2 | | 7/2002 |
| EP | 1 411 139 A1 | | 4/2004 |
| JP | H01-198430 A | | 8/1989 |
| JP | H07-220913 A | | 8/1995 |
| JP | H10-183251 A | | 7/1998 |
| JP | H11-335757 A | | 12/1999 |
| JP | 2000-120879 A | | 4/2000 |
| JP | 2002-292484 A | | 10/2002 |
| JP | 2003-129135 A | | 5/2003 |
| JP | 2007-277643 A | | 10/2007 |
| JP | 2012-177164 A | | 9/2012 |
| JP | 2015-161024 A | | 9/2015 |
| KR | 10-0372058 B1 | | 2/2003 |
| KR | 10-0523770 B1 | | 10/2005 |
| KR | 10-2008-0066744 A | | 7/2008 |
| KR | 10-0973391 B1 | | 7/2010 |
| KR | 10-1203286 B1 | | 11/2012 |
| KR | 10-1234452 B1 | | 2/2013 |
| KR | 10-2013-0128215 A | | 11/2013 |
| KR | 10-2013-0128731 A | | 11/2013 |
| KR | 20130128731 A | * | 11/2013 |
| KR | 10-1389647 B1 | | 4/2014 |
| KR | 10-2014-0087126 A | | 7/2014 |
| KR | 10-2014-0133838 A | | 11/2014 |
| WO | 2015-012562 A1 | | 1/2015 |
| WO | 2015/012562 A8 | | 1/2015 |
| WO | 2015/170755 A1 | | 12/2015 |

OTHER PUBLICATIONS

Japanese Office Action dated Aug. 13, 2019 issued in Japanese Patent Application No. 2018-533235.
Extended European Search Report issued in European Application No. 16879422.0 mailed Nov. 13, 2018.
Office Action issued in corresponding Chinese Application No. 201680076135.3, dated Mar. 4, 2019.
Chinese Office Action dated Oct. 24, 2019 issued in Chinese Patent Application No. 201680076135.3 (with English translation).

* cited by examiner

GRAIN-ORIENTED ELECTRICAL STEEL SHEET AND METHOD FOR MANUFACTURING SAME

TECHNICAL FIELD

The present disclosure relates to a grain-oriented electrical steel sheet and a method for manufacturing the same.

BACKGROUND ART

The grain-oriented electrical steel sheet is used as a core material for energy conversion of electronic equipment such as a transformer, by developing <001> magnetization easy axis texture in rolling direction. For applications in the transformer, a steel sheet with a relatively low core loss and excellent flux density properties is required, which will result in reduced power loss and higher energy conversion efficiency.

For the purpose of improving the magnetic properties of grain-oriented electrical steel sheet, a method of magnetic domain refinement may be used, which modifies the solidification characteristics and the specific resistivity properties and decreases the width of magnetic domains by way of component designing. The magnetic domain refinement may be divided into temporary magnetic domain refinement and permanent magnetic domain refinement depending on presence/absence of the lasting enhancement effect of the magnetic domain refinement after the stress relief annealing.

The grooving method, which is one of the permanent magnetic domain refinement methods, involves surface melting by laser emission to form a groove on the sheet surface. Accordingly, the method has a disadvantage of having transfer and scattering melts around the groove and occurrence of unavoidable surface spatter and hill-up. In addition, the method for suppressing increased groove depth and generation of defects around the groove area by way of applying or coating organic or inorganic material on the sheet surface has a disadvantage in that the process is complicated because it requires additional application and coating of organic or inorganic materials before the formation of the groove. In addition, the spatter removal method, which is more aggressive removal method that uses the brush, can leave damages on the surface due to the increased frictional force at a contact area between the brush and the steel sheet surface, when the frictional force is increased to deal with the increasing hill-up and spatter.

DISCLOSURE

Technical Problem

The present invention has been made in an effort to provide a grain-oriented electrical steel sheet and a method for manufacturing the same, which are capable of removing the hill-up and spatter formed on a sheet surface that has underwent hot annealing when the linear groove is formed on the sheet surface.

Technical Solution

A grain-oriented electrical steel sheet according to an embodiment of the present disclosure includes: a forsterite layer formed on the surface of an electrical steel sheet; a groove which is formed on the forsterite layer in a direction perpendicular to a rolling direction; and a forsterite calcination layer which is formed in the direction of both ends of the electrical steel sheet on the basis of an upper end of the groove and has a width of 1.1 to 1.3 times the width of the groove.

A 'hill-up', which is an elevation of melt generated during a formation of the groove and accumulated on both sides of the groove on an upper portion of the forsterite calcination layer, or the spatter, which is generated by scattering melt, may be formed to 1.5 μm or less from the surface of the forsterite calcination layer.

The groove may be formed to a depth of 2.5 to 10% with respect to a thickness of the electrical steel sheet.

The groove may be formed at an angle of ±90 to ±85° with respect to the rolling direction of the electrical steel sheet and may be formed in a linear shape.

The hill-up, which is an elevation of the melt generated during formation of the groove and accumulated on both sides of the groove on the upper portion of the forsterite calcination layer, or the spatter, which is generated by scattering melt, may be removed by brushing or pickling.

A method for manufacturing a grain-oriented electrical steel sheet according to an embodiment of the present disclosure includes steps of: heating a slab including 1.5 to 7 wt % of Si and other unavoidable impurities, with the remainder being Fe, and hot rolling the slab to prepare a hot rolled steel sheet; cold rolling the hot rolled steel sheet to prepare a cold rolled steel sheet, and then subjecting the cold rolled steel sheet to decarburization annealing and/or nitriding annealing to form an oxide layer on the surface of steel sheet; applying an annealing separator including MgO on the surface of the steel sheet on which the oxide layer is formed and performing hot annealing to form a forsterite layer (forsterite; MgDeletedTextsSiO$_{DeletedTexts}$) on the surface of the steel sheet; and emitting a continuous-wave laser of Gaussian mode onto the steel sheet formed with the forsterite layer to form a groove on the surface of a steel sheet, in which, in the step of forming the groove, the beam shape of the continuous-wave laser satisfies the range of Formula 1 below, and the retention time $T_d$ of the continuous wave laser satisfies the range of Formula 2 below.

DeletedTexts DeletedTexts DeletedTexts DeletedTexts $$1.3 \leq L_b/L_a \leq 7.0 \qquad 1)$$

$$0.5 \leq T_d \leq 10.0 \qquad 2)$$

(where, $L_a$ is the length of the laser beam in the rolling direction, $L_b$ is the widthwise length of the laser beam, $T_d$ is a ratio (W/$V_s$) of the scanning rate ($V_s$) of the laser beam scanned in the width direction to the widthwise emission width (W) emitted to the steel sheet width).

The step of forming the groove may include a step of emitting a continuous-wave laser of Gaussian mode to form a forsterite calcination layer in the direction of both ends of the electric steel sheet on the basis of the upper end of the groove, by a width of 1.1 to 1.3 times the width of the groove.

The step of forming the groove may include a step of forming the groove to a depth of 2.5 to 10% with respect to the thickness of the electrical steel sheet.

The step of forming the groove may include a step of forming the groove at an angle of ±90 to ±85° with respect to the rolling direction of the electrical steel sheet, and in a linear shape.

The step of forming the groove may further include steps of forming a hill-up, which is an elevation of melt generated during a formation of the groove and accumulated on both sides of the groove, or the spatter, which is generated by scattering melt, may be formed on an upper portion of the forsterite calcination layer, and removing the hill-up or the spatter to 1.5 μm or less from the surface of the forsterite calcination layer.

The step of removing the hill-up or the spatter may include a step of dry-removing using brush.

The brush may be a metal-based material or an abrasive material.

The step of removing the hill-up or the spatter may include a step of wet-removing through pickling.

The pickling may be carried out using an aqueous solution including hydrochloric acid, nitric acid or sulfuric acid.

The concentration of aqueous solution may be 1 to 30 wt %.

Advantageous Effects

According to an embodiment of the present disclosure, the hill-up or spatter defects around the groove appearing during the formation of the groove by laser emission can be effectively removed, thereby it is possible to manufacture a low core-loss grain-oriented electric steel sheet having excellent insulation and space factor as well as a core loss reduction effect provided by the groove.

MODE FOR INVENTION

The terms "first", "second" and "third" as used herein are intended to describe various parts, components, regions, layers and/or sections, but not construed as limiting. These terms are merely used to distinguish any parts, components, regions, layers and/or sections from another parts, components, regions, layers and/or sections. Accordingly, a first part, component, region, layer or section to be described below may be referred to as a second part, component, region, layer or section without departing from the scope of the present disclosure.

The terminology used herein is for the purpose of describing particular embodiments only and is not intended to limit the present disclosure. The singular forms used herein include plural forms as long as the phrases do not expressly mean to the contrary. As used herein, the meaning of "comprising" specifies specific features, regions, integers, steps, operations, elements and/or components, and does not exclude the presence or the addition of other features, regions, integers, steps, operations, elements and/or components.

When a portion is referred to as being "above" or "on" another portion, it may be directly on another portion or may be accompanied by yet another portion disposed in between. In contrast, when a portion is referred to as being "directly above" another portion, no other portion is interposed in between.

Unless otherwise defined, all terms including technical and scientific terms used herein have the same meaning as commonly understood by those with ordinary knowledge in the art to which this invention belongs. Terms defined in the general dictionaries are not to be construed as the ideal or very formal meanings unless they are further interpreted and defined as having a meaning consistent with the relevant technical literature and the present disclosure.

Hereinafter, preferred embodiments of the present disclosure will be described in detail to help those with ordinary knowledge in the art easily achieve the present disclosure. As those skilled in the art would realize, the described embodiments may be modified in various different ways, all without departing from the spirit or scope of the present invention.

Figure 1:
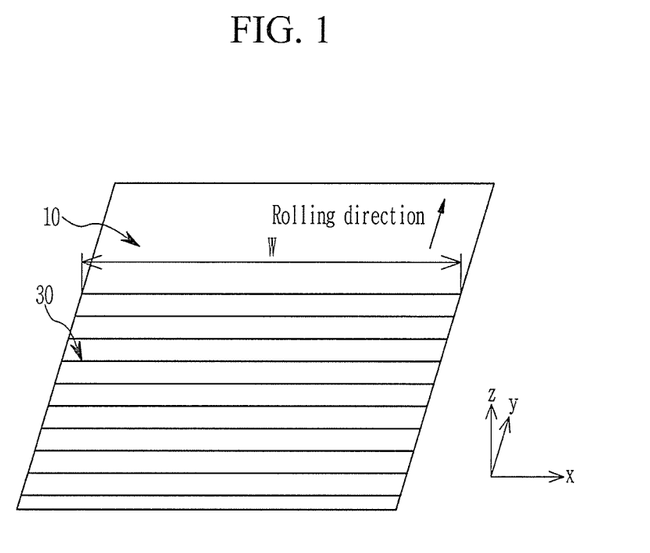
FIG. 1 is a view schematically showing the laser emission in the direction perpendicular to the rolling direction on the surface of the grain-oriented electrical steel sheet according to an embodiment of the present disclosure.

FIG. 1 is a view showing a groove 30 formed by emission of a continuous-wave laser of Gaussian mode, after a forsterite layer 20 is formed on a surface of the grain-oriented electrical steel sheet 10.

As shown in FIG. 1, forming the groove 30 inevitably suffers a disadvantage that the surface spatter or hill-up occurs due to transferring and scattering of the melt around the groove. The grain-oriented electrical steel sheet according to an embodiment of the present disclosure includes a forsterite calcination layer 40 in the direction of both ends of the electric steel sheet 10 on the basis of the upper end of the groove 30, by a width ($W_s$) of 1.1 to 1.3 times the width ($W_0$) of the groove 30. Since the forsterite calcination layer 40 does not react with spatter or hill-up, spatter or hill-up can be easily removed.

Figure 2:
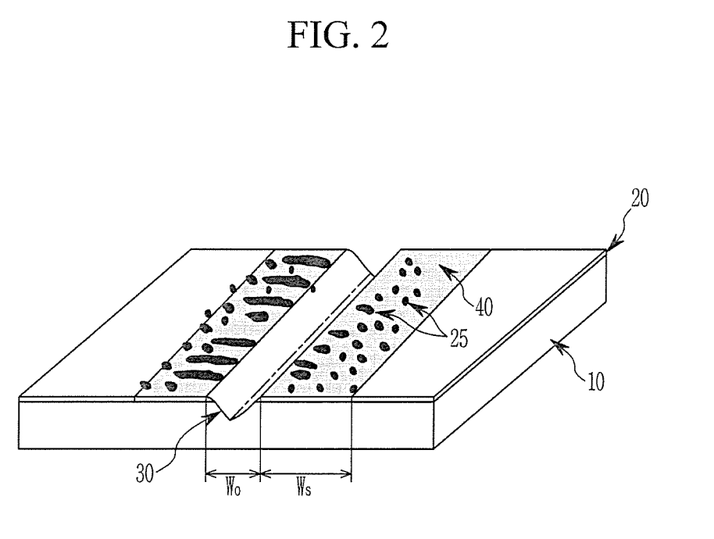
FIG. 2 is a schematic view showing a hill-up or spatter formed on an upper portion of a forsterite calcination layer when a laser is emitted onto a surface of a grain-oriented electrical steel sheet according to an embodiment of the present disclosure.

FIG. 2 is a schematic view showing a hill-up or spatter 25 formed on an upper portion of the forsterite calcination layer 40 when a laser is emitted onto a surface of a grain-oriented electrical steel sheet 10 according to an embodiment of the present disclosure.

In an embodiment of the present invention, the forsterite calcination layer 40 may be formed in the direction of both ends of the electrical steel sheet 10 on the basis of the upper end of the groove 30, by a width $W_s$ of 1.1 to 1.3 times the width $W_0$ of the groove 30. Accordingly, 85% or more of the spatter or hill-up 25 that occurs during emission of the laser is formed on the forsterite calcination layer 40, and the spatter or hill-up 25 can be easily removed.
DeletedTexts As shown in FIGS. 1 and 2, a grain-oriented electrical steel sheet according to an embodiment of the present disclosure includes: a forsterite layer 20 formed on the surface of the electrical steel sheet 10; a groove 30 which is formed on the forsterite layer 20 in a direction perpendicular to a rolling direction; and a forsterite calcination layer which is formed in the direction of both ends of the electrical steel sheet on the basis of an upper end of the groove and has a width ($W_s$) of 1.1 to 1.3 times the width ($W_0$) of the groove.

First, the grain-oriented electrical steel sheet 10 will be described below. The grain-oriented electrical steel sheet is used as a core material of electrical device such as transformer and is a steel sheet with magnetic properties of low core loss and high flux density in order to reduce the power loss of electrical device and increase efficiency. The grain-oriented electrical steel sheet used in one embodiment of the present disclosure is not limited to a grain-oriented electrical steel sheet having a specific composition or crystalline structure, but is applicable to all grain-oriented electrical steel sheets. More specifically, the grain-oriented electrical steel sheet including 1.5 to 7 wt % of Si, with the remainder of Fe and unavoidable impurities may be used. In addition to Si, the grain-oriented electrical steel sheet may further include C, Al, N, P, Mn, Sn, Sb, or the like A forsterite (Mg2SiO$_4$) layer 20 is formed on the surface of the grain-oriented electrical steel sheet 10. The forsterite layer 20 may be formed to a thickness of 1 to 5 μm on the surface of the grain-oriented electrical steel sheet 10. The forsterite layer 20 may be generated by a reaction of the oxide layer (SiO$_2$ or FeSiO$_4$) of the steel sheet surface produced by decarburization annealing in the hot annealing step of the grain-oriented electrical steel sheet 10 with MgO which is the main component of the annealing separator.

The groove 30 is formed on the forsterite layer 20 in a direction perpendicular to the rolling direction. The groove 30 is formed to reduce the width of magnetic domains for the purpose of improving the magnetic properties of the grain-oriented electrical steel sheet.

The groove 30 may be formed to a depth of 2.5 to 10% with respect to the thickness of the electrical steel sheet 10. It is possible to efficiently achieve the effect of magnetic domain refinement within the range described above.

FIGS. 1 and 2 show the groove 30 being formed in a direction perpendicular to the rolling direction of the electrical steel sheet 10 by way of example, but the present disclosure is not limited thereto. Specifically, the groove 30 may be formed at an angle of ±90 to ±85° with respect to the rolling direction of the electrical steel sheet and may be formed in a linear shape. The noise reduction effect of the grain-oriented electrical steel sheet 10 may be achieved in the range of angles described above.

The forsterite calcination layer 40 may be formed in the direction of both ends of the electrical steel sheet 10 on the basis of the upper end of the groove 30, by a width ($W_s$) of 1.1 to 1.3 times the width ($W_0$) of the groove 30.

The forsterite calcination layer 40 is calcined by the heat generated during the laser emission of the forsterite layer 20, and has a reduced surface roughness due to sintering of the surface MgO-based forsterite and some unreacted MgO layers. The sheet surface roughness before insulation coating is 0.3 to 5 μm, and the sheet surface roughness is reduced during sintering to 0.1 to 3 μm.

Since the forsterite calcination layer 40 does not react with spatter or hill-up, compared to when there is no forsterite calcination layer formed, the spatter or the hill-up can be removed more easily. The width (Ws) of the forsterite calcination layer 40 is formed to be 1.1 to 1.3 times the width of the groove ($W_0$). The spatter or the hill-up 25 can be formed on the forsterite calcination layer 40 only when the width (Ws) of the forsterite calcination layer 40 is formed in the range described above, allowing easy removal thereof. The method for adjusting the width ($W_s$) of the forsterite calcination layer 40 to the range described above is not particularly limited, although according to an embodiment of the present disclosure, the method may appropriately limit the shape of the laser beam and the laser retention time. This will be described in greater detail below with reference to a method for manufacturing the grain-oriented electrical steel sheet according to an embodiment of the present disclosure.

The hill-up, which is an elevation of melt generated during a formation of the groove and accumulated on both sides of the groove 30, or the spatter, which is generated by scattering melt, adversely affects the core loss and the insulation of the electrical steel sheet. Accordingly, it is preferable to remove the hill-up or spatter 25 as much as possible. The grain-oriented electrical steel sheet according to an embodiment of the present disclosure includes the forsterite calcination layer 40 suitably formed therewith, and allows easy removal of the spatter or hill-up 25 formed on the forsterite calcination layer 40. Accordingly, a grain-oriented electrical steel sheet according to an embodiment of the present disclosure may have the hill-up or spatter 25 formed from the surface of the forsterite calcination layer 40 to 1.5 μm or less.

Brushing or pickling may be implemented to more reliably remove the hill-up or spatter 25. When both brushing and pickling are performed, the hill-up or spatter may remain at a much smaller size.

Figure 3:
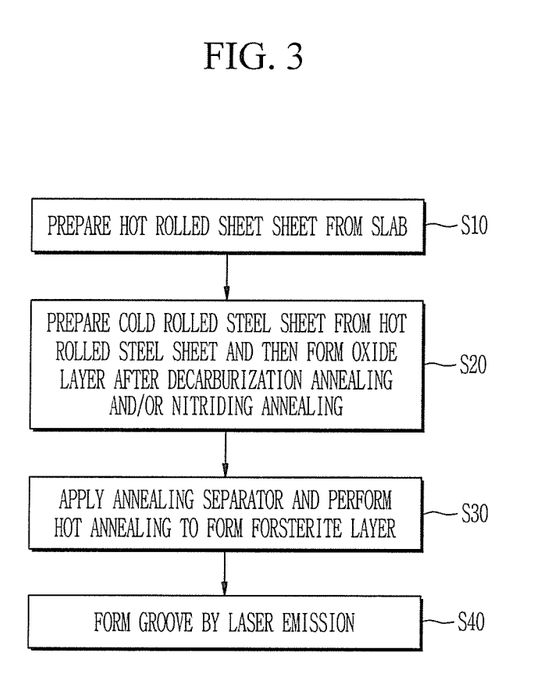
FIG. 3 is a process diagram of a method for manufacturing a grain-oriented electrical steel sheet according to the present disclosure.

FIG. 3 schematically shows a flow diagram of a method for manufacturing a grain-oriented electrical steel sheet according to an embodiment of the present disclosure. The flowchart of the method for manufacturing a grain-oriented electrical steel sheet of FIG. 3 is intended to merely illustrate the present disclosure, while the present disclosure is not limited thereto. Accordingly, various modifications of the method for manufacturing a grain-oriented electrical steel sheet may be contemplated.

A method for manufacturing a grain-oriented electrical steel sheet according to an embodiment of the present disclosure includes steps of: heating a slab including 1.5 to 7 wt % of Si and other unavoidable impurities, with the remainder being Fe, and hot rolling the slab to prepare a hot rolled steel sheet (S10); cold rolling the hot rolled steel sheet to prepare a cold rolled steel sheet, and then subjecting the cold rolled steel sheet to decarburization annealing and/or nitriding annealing to form an oxide layer on the surface of steel sheet (S20); applying an annealing separator including MgO on the surface of the steel sheet on which the oxide layer is formed and performing hot annealing to form a forsterite layer (forsterite; Mg$_2$SiO$_4$) on the surface of the steel sheet (S30); and emitting a continuous-wave laser of Gaussian mode onto the steel sheet formed with the forsterite layer to form a groove on the surface of a steel sheet (S40). DeletedTexts DeletedTexts DeletedTexts At this time, in order to form the forsterite calcination layer 40 on the electrical steel sheet, the step of forming a groove (S40) may include a step of appropriately limiting the type, shape, laser retention time, and so on of the laser beam.

Specifically, the type of the laser beam may be a continuous-wave laser of Gaussian mode. The continuous-wave laser may be used, because pulsed wave oscillation induces evaporation rather than accompanying melting.

In addition, the shape of the laser beam may be the one that satisfies the range of Formula 1 below.

$$1.3 \leq Lb/La \leq 7.0 \qquad 1)$$

$$1.3 \leq L\text{DeletedTexts}/L\text{DeletedTexts} \leq 7.0 \qquad 1)$$

Figure 4:
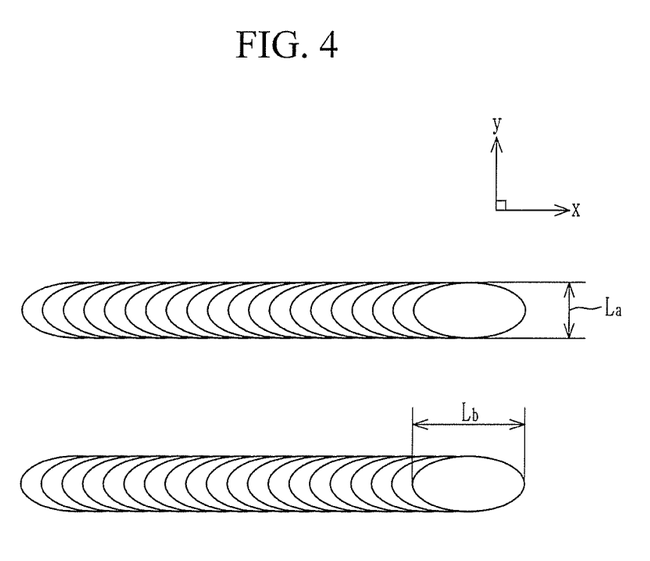
FIG. 4 is a view showing a shape of a laser on an XY plane when the laser is emitted onto the surface of a grain-oriented electrical steel sheet according to an embodiment of the present disclosure.

FIG. 4 schematically shows the shape of the laser beam according to an embodiment of the present disclosure. As shown in FIG. 4, the ratio (Lb/La) of the rolling direction beam length (La) to the width direction beam length (Lb) may be in the range of 1.3 to 7.0. When the final beam length ratio is less than 1.3, that is, when the beam shape is close to the circular shape, the width (Ws) of the forsterite calcination layer 40 formed around the groove 30 may be narrowed, and the partial trap of the melt of the groove may occur. When the final beam length ratio exceeds 7.0, that is, when the beam shape is close to the line shape, there may arise a problem in that the formation of the groove 30 becomes difficult, and it is difficult to secure the effect of the magnetic domain refinement. Accordingly, the shape of the laser beam described above may be used.

The laser retention time ($T_d$) is defined as a ratio ($W/V_s$) of the scanning rate ($V_s$) of the laser beam scanned in the width direction to the widthwise emission width (W) emitted to the steel sheet width and it may be adjusted so as to satisfy Formula 2 below.

$$0.5 \leq T_d \leq 10.0 \quad \quad 2)$$

When the retention time is too short, i.e., 0.5 ms or less, problem may occur, in which case the width (Ws) of the forsterite calcination layer is overly narrowed during groove formation. If the retention time is too long, i.e., greater than 10 ms, problem may also occur, in which case the width ($W_s$) of the forsterite calcination layer is increased, with the scattering length of the hill-up or spatter also being relatively lengthened. Accordingly, the retention time may be adjusted to the range described above. More specifically, the retention time may be 1.0 to 9.6 ms.

Hereinafter, each step will be described in detail.

First, in S10, a slab including 1.5 to 7 wt % of Si and other unavoidable impurities, with the remainder being Fe, is heated and hot rolled to prepare a hot rolled steel sheet. The slab used in an embodiment of the present disclosure is not limited to a slab of a particular composition, but is applicable to general slabs used in the manufacture of a grain-oriented electrical steel sheet. More specifically, a slab including 1.5 to 7 wt % of Si, with the remainder of Fe and impurities may be used. In addition to Si, the grain-oriented electrical steel sheet may further include C, Al, N, P, Mn, Sn, Sb, or the like Next, in S20, the hot rolled steel sheet is cold rolled to prepare a cold rolled steel sheet, and then subjected to decarburization annealing and/or nitriding annealing to form an oxide layer on the surface of steel sheet. Either the decarburization annealing or the nitriding annealing may be performed, or both the decarburization annealing and the nitriding annealing may be performed. When both the decarburization annealing and the nitriding annealing are performed, the order in which the annealing is performed is not limited, and may also be performed simultaneously. The oxide layer of the steel sheet surface may be formed from $SiO_2$ or $FeSiO_4$.

Next, in S30, an annealing separator including MgO is applied to the surface of the steel sheet on which the oxide layer is formed, and hot annealing is performed to form a forsterite layer (forsterite; $Mg2SiO_2$) on the surface of the steel sheet. At this time, the forsterite layer 20 may be formed to a thickness of 1 to 5 μm on the surface of the grain-oriented electrical steel sheet 10 and may include unreacted MgO as well as forsterite ($Mg_2SiO_4$).

Next, in S40, a continuous-wave laser of Gaussian mode is emitted onto the steel sheet formed with the forsterite layer to form a groove on the surface of a steel sheet. At this time, the forsterite layer is sintered by the heat generated from the laser, to thus form the forsterite calcination layer 40. In S40, the width ($W_s$) of the forsterite calcination layer 40 may be adjusted by limiting the type, shape, and retention time of the emitted laser. The width (Ws) of the forsterite calcination layer 40 may be formed to be 1.1 to 1.3 times the width of the groove ($W_0$).

In S40, the groove 30 may be formed to a depth of 2.5 to 10% with respect to the thickness of the electrical steel sheet 10. It is possible to efficiently achieve the effect of magnetic domain refinement within the range described above. In addition, in S40, the groove 30 may be formed at an angle of ±90 to ±85° with respect to the rolling direction of the electrical steel sheet, and may be formed in a linear shape. The noise reduction effect of the grain-oriented electrical steel sheet 10 may be achieved in the range of angles described above.

During the process of forming the groove 30 through the laser emission in S40, the hill-up, which is an elevation of melt generated during a formation of the groove and accumulated on both sides of the groove, or the spatter, which is generated by scattering melt, is formed on the forsterite calcination layer 40. At this time, since the forsterite calcination layer 40 does not react with the spatter or hill-up, spatter or hill-up may be easily removed.

Although not shown in FIG. 3, after step S40, the method may further include a step of removing the hill-up or spatter on the surface of the forsterite calcination layer to 1.5 μm or less (S50).

The step (S50) may include dry-removing using brush (S50-1), or wet-removing through pickling (S50-2). The method may include either or both of the two steps mentioned above. When both of the two steps are included, the surface roughness characteristic of 1.0 μm or less may be secured.

The step (S50-1) is about dry-removing using brush. In this case, brush is not particularly limited as long as it is a material capable of removing hill-up or spatter, and may be specifically metal-based material or abrasive material, for example. As described above, since the forsterite calcination layer 40 does not react with the spatter or hill-up 25, it may be easily removed with a less frictional force.

The step (S50-2) is about wet-removing by pickling. For pickling, a solution that can dissolve away the hill-up or spatter may be used, such as an aqueous solution including hydrochloric acid, nitric acid or sulfuric acid, for example. In this example, the concentration of aqueous solution may be 1 to 30 wt %.

After step (S50), a step of stress relief annealing may be further included.

Hereinafter, the present disclosure is explained in more detail with reference to Examples. However, the Examples are described merely to illustrate the present disclosure, and the present disclosure is not limited thereto.

EXAMPLE 1

A grain-oriented electrical steel sheet with a thickness of 0.23 mm was prepared, having a forsterite layer formed on the surface thereof by applying a MgO annealing separator and performing hot annealing. The continuous wave laser of Gaussian mode was emitted, with the emission linewidth of 6 distinct lines at the interval of 200 mm, and the laser retention time being maintained for 3.0 ms. The beam shape ($L_{DeletedTexts}/L_{DeletedTexts}$) of the laser was controlled to be 1.3 and the groove depth was controlled to be 13 μm. The width ($W_0$) of the upper portion of the groove was 45 μm, and the maximum height of the hill-up and spatter appearing around the groove was 5 μm. DeletedTexts The width ($W_s$) of the forsterite calcination layer was 55 μm.

The hill-up and spatter were polished with brush (200 μm diameter, stainless steel material, 50% areal density). The maximum height of the hill-up and spatter after polishing was 0.95 μm. Then, the grain-oriented electrical steel sheet was prepared using 10 wt % sulfuric acid aqueous solution. The maximum height of hill-up and spatter after pickling was 0.3 μm.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

EXAMPLE 2

The sample was prepared in the same manner as in Example 1 described above except that the beam shape ($L_a/L_b$) of the laser, the depth of the groove and the laser retention time were changed to the values summarized in the Table 1 below and that pickling was not performed.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

EXAMPLE 3

The sample was prepared in the same manner as in Example 1 described above except that the beam shape ($L_a/L_b$) of the laser, the depth of the groove and the laser retention time were changed to the values summarized in the Table 1.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

EXAMPLE 4

The sample was prepared in the same manner as in Example 1 described above except that the beam shape ($L_a/L_b$) of the laser, the depth of the groove and the laser retention time were changed to the values summarized in the Table 1, and that brushing was not performed.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

EXAMPLE 5

The sample was prepared in the same manner as in Example 1 described above except that the beam shape ($L_a/L_b$) of the laser, the depth of the groove and the laser retention time were changed to the values summarized in the Table 1 below and that pickling was not performed.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

COMPARATIVE EXAMPLE 1

The sample was prepared in the same manner as in Example 1 described above except that the beam shape ($L_a/L_b$) of the laser, the depth of the groove and the laser retention time were changed to the values summarized in the Table 1 below and that neither brushing, nor pickling was performed.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

COMPARATIVE EXAMPLE 2

The sample was prepared in the same manner as in Example 1 described above except that the beam shape ($L_a/L_b$) of the laser, the depth of the groove and the laser retention time were changed to the values summarized in the Table 1 below and that neither brushing, nor pickling was performed.

The core loss ($W_{17/50}$) of the electric steel sheet before laser emission and the core loss after laser emission and stress relief annealing (SRA) were measured and are summarized in Table 1 below. The electrical insulating value and space factor were measured and are summarized in Table 1 below.

TABLE 1

| Items | Groove depth (μm) | Laser beam shape ($L_a/L_b$) | Retention time (ms) | Ratio of calcination layer width to groove width | Use of brush | Use of pickling | Before laser emission $W_{17/50}$ | After SRA | Core loss enhance % | Electrical insulating value | Space factor mA |
|---|---|---|---|---|---|---|---|---|---|---|---|
| Ex. 1 | 13 | 1.3 | 0.5 | 1.1 | Yes | Yes | 0.83 | 0.71 | 14.5 | 5 | 97.0 |
| Ex. 2 | 18 | 1.3 | 10.0 | 1.3 | Yes | No | 0.83 | 0.72 | 13.3 | 30 | 96.5 |
| Ex. 3 | 13 | 6.7 | 6.5 | 1.2 | Yes | Yes | 0.84 | 0.70 | 16.7 | 0 | 96.9 |
| Ex. 4 | 12 | 7.0 | 0.5 | 1.1 | No | Yes | 0.83 | 0.71 | 14.5 | 10 | 96.9 |
| Ex. 5 | 17 | 7.0 | 10.0 | 1.3 | Yes | No | 0.84 | 0.73 | 13.1 | 35 | 96.6 |
| Comp. Ex. 1 | 21 | 7.0 | 11.0 | 1.4 | No | No | 0.83 | 0.77 | 7.2 | 650 | 93.5 |
| Comp. Ex. 2 | 8 | 7.0 | 0.3 | 0.9 | No | No | 0.84 | 0.78 | 7.1 | 350 | 94.5 |

As shown in Table 1, the grain-oriented electrical steel sheet prepared according to Examples 1 to 5 was prevented from experiencing deterioration of the electrical insulating value and space factor, and the core loss improvement rate of 13% or more could be achieved after heat treatment.

It will be understood that the present disclosure is not limited to the above embodiments but may be embodied in many different forms from each other and those of ordinary skill in the art to which the present disclosure pertains can implement the invention in other specific forms without changing the technical idea or essential features of the present disclosure. Accordingly, it will be understood that the exemplary embodiments described above are only illustrative, and should not be construed as limiting.

DESCRIPTION OF SYMBOLS

10: grain-oriented electrical steel sheet,
20: forsterite layer
25: hill-up, spatter
30: groove
40: forsterite calcination layer

The invention claimed is:

1. A grain-oriented electrical steel sheet, comprising:
a forsterite layer formed of $Mg_2SiO_4$ on the surface of an electrical steel sheet;
a groove which is formed on the forsterite layer in a direction perpendicular to a rolling direction; and
a forsterite calcination layer which is formed in the direction of both ends of the electrical steel sheet on the basis of an upper end of the groove and has a width of 1.1 to 1.3 times the width of the groove;
wherein the groove is formed to a depth of 2.5 to 10% with respect to a thickness of the electrical steel sheet and at an angle of ±90 to ±85° with respect to the rolling direction of the electrical steel sheet and formed in a linear shape;
wherein a hill-up, which is an elevation of melt generated during a formation of the groove and accumulated on both sides of the groove on an upper portion of the forsterite calcination layer, or a spatter, which is generated by scattering melt, is formed to 1.5 μm or less from a surface of the forsterite calcination layer; and
wherein 85 area % or more of the spatter and hill-up are on the forsterite calcination layer.

2. The grain-oriented electrical steel sheet of claim 1, wherein the hill-up, which is an elevation of melt generated during formation of the groove and accumulated on both sides of the groove on the upper portion of the forsterite calcination layer, or the spatter, which is generated by scattering melt, is removed by brushing or pickling.

3. The grain-oriented electrical steel sheet of claim 1, wherein the electrical steel sheet comprises 1.5 to 7 wt % of Si.

4. A method for manufacturing the grain-oriented electrical steel sheet of claim 1, comprising steps of:
heating a slab including 1.5 to 7 wt % of Si and other unavoidable impurities, with the remainder being Fe, and hot rolling the slab to prepare a hot rolled steel sheet;
cold rolling the hot rolled steel sheet to prepare a cold rolled steel sheet, and then subjecting the cold rolled steel sheet to decarburization annealing and/or nitriding annealing to form an oxide layer on the surface of steel sheet;
applying an annealing separator including MgO on the surface of the steel sheet on which the oxide layer is formed and performing hot annealing to form a forsterite layer (forsterite; Mg2SiO4) on the surface of the steel sheet; and
emitting a continuous-wave laser of Gaussian mode onto the steel sheet formed with the forsterite layer to form a groove on the surface of a steel sheet, wherein, in the step of forming the groove, the beam shape of the continuous-wave laser satisfies the range of Formula 1 below, and the retention time Td of the continuous wave laser satisfies the range of Formula 2 below;

$$1.3 \leq L_b/L_a \leq 7.0 \quad 1)$$

$$0.5 \leq T_d \leq 10.0 \quad 2)$$

(where, $L_a$ is the length of the laser beam in the rolling direction, $L_b$ is the widthwise length of the laser beam, Td is a ratio ($W/V_s$) of the scanning rate ($V_s$) of the laser beam scanned in the width direction to the widthwise emission width (W) emitted to the steel sheet width);
thereby producing the grain-oriented electrical steel sheet of claim 1.

5. The method of claim 4, wherein
the step of forming the groove comprises a step of emitting a continuous-wave laser of Gaussian mode to form a forsterite calcination layer in the direction of both ends of the electric steel sheet on the basis of the upper end of the groove, by a width of 1.1 to 1.3 times the width of the groove.

6. The method of claim 4, wherein
the step of forming the groove comprises a step of forming the groove to a depth of 2.5 to 10% with respect to the thickness of the electrical steel sheet.

7. The method of claim 4, wherein
the step of forming the groove comprises a step of forming the groove to an angle of ±90 to ±85° with respect to the rolling direction of the electrical steel sheet, and in a linear shape.

8. The method of claim 4, wherein the step of forming the groove further comprises steps of: forming a hill-up, which is an elevation of melt generated during a formation of the groove and accumulated on both sides of the groove, or the spatter, which is generated by scattering melt, on an upper portion of the forsterite calcination layer; and removing the hill-up or the spatter on the surface of the forsterite calcination layer to 1.5 m or less.

9. The method of claim 8, wherein
the step of removing the hill-up or the spatter comprises a step of dry-removing using brush.

10. The method of claim 9, wherein
the brush is a metal-based material or abrasive material.

11. The method of claim 8, wherein
the step of removing the hill-up or the spatter further comprises a step of wet-removing using pickling.

12. The method of claim 11, wherein
the pickling is carried out using an aqueous solution including hydrochloric acid, nitric acid or sulfuric acid.

13. The method of claim 12, wherein
a concentration of the aqueous solution is 1 to 30 wt %.

* * * * *